United States Patent [19]

Seit et al.

[11] 4,171,027

[45] Oct. 16, 1979

[54] MOUNTING SYSTEM FOR THE TERMINAL DRIVE OF A TRACKED VEHICLE

[75] Inventors: Horst Seit, Steinbach; Eugen Schlegl, Dachau, both of Fed. Rep. of Germany

[73] Assignee: Krauss-Maffei Aktiengesellschaft, Munich, Fed. Rep. of Germany

[21] Appl. No.: 760,502

[22] Filed: Jan. 19, 1977

[51] Int. Cl.$^2$ .............................................. B62D 55/12
[52] U.S. Cl. ................................. 180/9.54; 180/73 R; 267/63 A; 267/153; 280/716
[58] Field of Search ........................ 180/9, 9.2 R, 9.26, 180/9.5, 9.54, 9.62, 5 R, 73 R, 75; 280/671, 716, 717; 267/153, 63 R, 63 A

[56] References Cited

U.S. PATENT DOCUMENTS

| | | | |
|---|---|---|---|
| 1,443,871 | 1/1923 | Davis | 180/9.2 R |
| 2,830,826 | 4/1958 | Mantzel | 280/716 X |
| 3,688,858 | 9/1972 | Jespersen | 180/9.2 R X |

*Primary Examiner*—John P. Silverstrim
*Attorney, Agent, or Firm*—Karl F. Ross

[57] ABSTRACT

A mounting assembly for the terminal drive of the track of a tracked vehicle, especially a tank or like military vehicle, comprises a final-drive assembly which is received in an opening of the hull of the vehicle with all-around clearance and means bridging the housing of this drive assembly and the hull for elastically supporting the drive assembly with limited freedom of movement thereof transverse to its axis.

11 Claims, 6 Drawing Figures

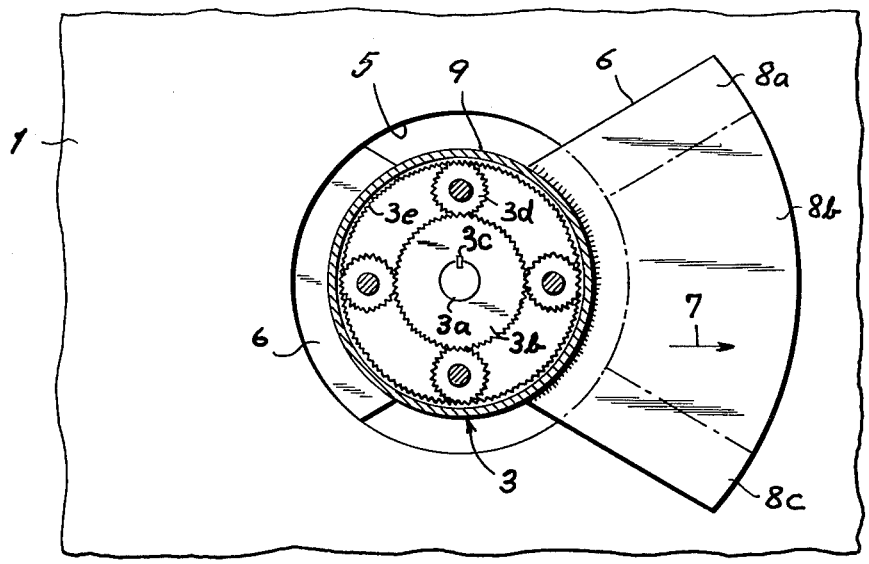
FIG. 1A
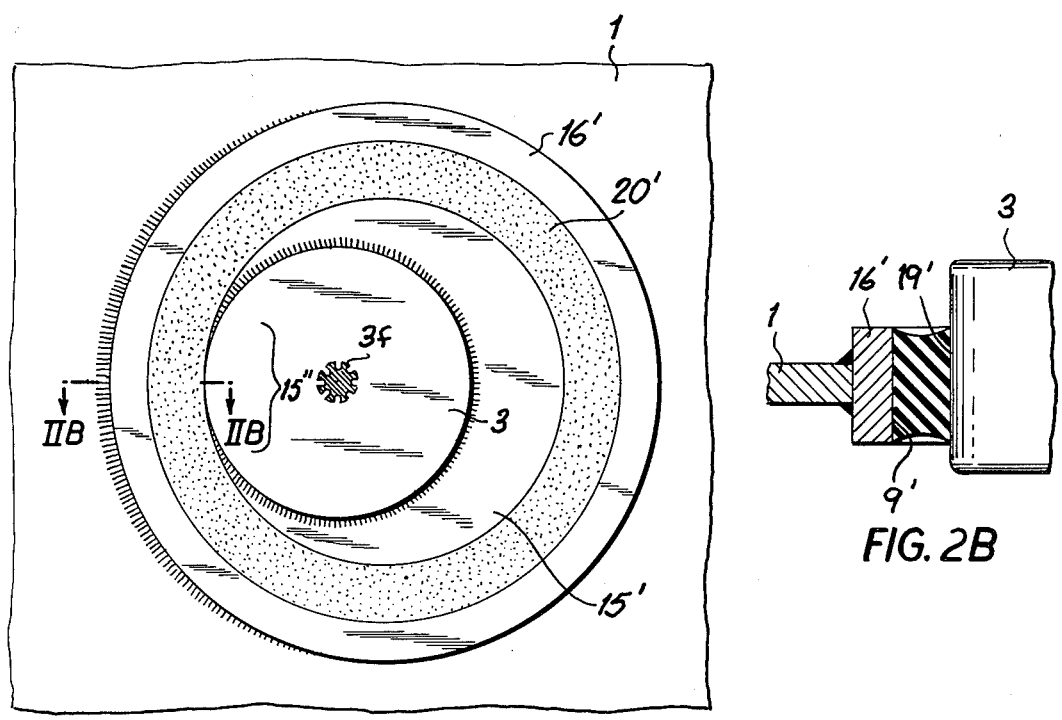
FIG. 2A
FIG. 2B

MOUNTING SYSTEM FOR THE TERMINAL DRIVE OF A TRACKED VEHICLE

FIELD OF THE INVENTION

The present invention relates to a mounting assembly for the drive wheel of the track of a tracked vehicle, most commonly a military vehicle such as a tank. More particularly, the invention relates to a drive assembly for the track of a tank which includes a terminal or final drive whose output side carries the chain-drive wheel and is generally formed as a planetary.

BACKGROUND OF THE INVENTION

The tracks of tracked vehicles such as tanks generally comprise rectilinear links which are articulated together and pass successively around the periphery of a substantially circular drive wheel or sprocket which is provided on the output side of a terminal drive which can be mounted on a wall of the vehicle, such as a tank hull, and which has its input side connected to the drive train of the vehicle. Since the chain engages the drive wheel as a polygon rolling on a cylindrical surface, the interaction between the drive wheel and the chain is nonuniform, i.e. intermittent loads are applied to the drive wheel, even though a continuous tension is developed on the chain, and the forces transmitted to the axis of the drive wheel vary between a maximum and a minimum as each link engages and swings around the drive wheel.

Thus the runoff speed of the chain alternates between a maximum value as the link lies tangentially to the wheel and is positively driven thereby and a minimum value intermediate these maximum values as new links successively reach the drive wheel and are swung therearound.

This repetitive variation in the runoff speed gives rise to periodic accelerations and decelerations of the vehicle mass and the track which results, not only in high wear of the joints between the track links, of the portions of the track chain engaged by the wheel and of the portions of the wheel engaging the track, but also, especially at high speeds of the vehicle, in a significant jolting of the personnel in the vehicle. Such periodic oscillations have also been found to detrimentally affect the highly sensitive optical devices usually present in tanks and similar track-laying military vehicles.

It has already been proposed to provide the chain-drive wheel with an elastomeric ring to cushion these periodic oscillations and damp the shocks generated by the nonuniform speeds of the portions of the chain or track as they pass around the drive wheel.

It has been found, however, that such elastomeric rings are subject to squeezing effects which excessively load the rubber in the regions thereof surrounding the crown about which they were disposed, thereby generating heat which results in deterioration of the rubber.

OBJECTS OF THE INVENTION

It is an object of the invention to provide a drive sytem for a vehicle of the track-laying or tracked type whereby the disadvantages of the aforementioned systems are obviated.

Another object of this invention is to provide an improved arrangement for the mounting of the terminal drive (end drive) of a tracked vehicle, especially a military vehicle such as a tank, which damps or cushions the shocks generated by the aforementioned polygon effect so as to minimize disturbance of personnel carried by the vehicle and optical components and other sensitive components therein.

It is another object of the invention, moreover, to provide an improved system for cushioning the periodic oscillations generated by alternating acceleration and deceleration of the track drive of a track-laying vehicle without the disadvantages and drawbacks disclosed above.

SUMMARY OF THE INVENTION

These objects and other which will become apparent hereinafter are attained, in accordance with the prevent invention, in a drive (side gear unit: Volume Two, THE WAY THINGS WORK, Simon & Shuster, N.Y. 1971, Pages 242-243) which passes through a wall of the vehicle and terminates in the track-driving wheel or sprocket and which is disposed to be movable in all directions relative to this wall substantially transverse to the axis of this drive, i.e. which passes through the wall with all-around clearance.

According to the invention, an elastic mounting of this drive on the wall is provided such that the drive can move elastically substantially only parallel to itself, i.e. is not capable of inclination or twisting to any significant extent. The term "parallel to itself" is intended to refer to a movement of the drive which is orthogonal to the axis but in the plane thereof and substantially parallel to the wall with respect to which the drive is elastomerically mounted. In other words, the axis should remain substantially perpendicular to this wall as is guaranteed if two such joints are provided to connect the final drive to the transmission arrangement.

It has been found to be advantageous to mount the drive for movement in any direction with parallel axes by providing an elastomeric body which surrounds the drive and is interposed between the drive and the wall of the vehicle, usually the hull of the tank. However, this mobility in substantially all directions perpendicular to the drive axis can also be insured by elastic means which does not extend around the entire circumference of the drive. In this case, the elastic means can be a slab of an elastomeric material sandwiched between the hull of the tank or a plate rigid with the hull and a plate connected to the drive and lying in a plane perpendicular to the axis but parallel to the hull. In all of the embodiments of the invention, especially when the drive is the final or terminal gear box of the drive train, all of the oscillations and vibrations resulting from the polygonal interaction of the track and the drive wheel are cushioned without such deformation of the elastomeric body as will generate significant amounts of heat therein and cause disturbance to the occupants of the vehicle or the instruments thereof. The omnidirectional elastomeric support is also effective to resist forces in the lateral direction, i.e. oscillations or intermittent shocks, which can develop when pintles or hinge pins (link pins) of the track on opposite sides do not engage the drive wheels simultaneously.

Since the forces which act upon the final transmission gear box (side gear unit) are not uniformly distributed about the periphery thereof, the spring constant or stiffness of the elastomeric cushion can be varied, according to a feature of the invention, radially outwardly of the axis or parallel to this axis over the periphery of this gear box housing. In this case the spring force distribution and cushion hardness or stiffness is varied in accordance with the forces to which the housing of the final drive will be subjected by the effects described above.

A relatively simple construction of the mounting arrangement of the invention can be obtained when, to a first approximation, the stiffness of the cushion in a direction parallel to the axis of the terminal drive is greater than the stiffness or hardness of the cushion using the plane perpendicular to this axis. This prevents tilting of the axis and of the chain-driving wheel in a particular simple and compact construction.

When structural considerations prevent the use of large elastic bodies which are capable of withstanding peak loads, the overloading of the elastic body can be prevented by providing rigid abutments between the drive and the tank hull which interengage when the elastic deformation of the cushion has reached its maximum.

The provision of rigid abutments or movement-limiting members is advantageous whenever the applied forces overcome the spring force, especially for overpeak loading and whenever the shocks which may be applied to the drive are excessive.

In the preferred realization of the invention, the elastic mounting of the drive is effected with an elastomeric material such as rubber, which has the advantageous characteristic that it not only provides a spring or resilient action but also functions as a damper for the shocks or vibrations which may be generated by the interaction of the drive wheel and the track or chain. The elastomeric cushion is especially effective when structural considerations require that the mounting have small dimensions.

In one embodiment of the invention, which is especially simple and desirable for this reason, the mounting means can comprise a pair of plates which are fixed directly to the final-drive housing and can extend in the direction of the tractive force applied by the chain to the drive, generally parallel to the wall of the tank hull in which the housing is received with all-around clearance. An elastic body is disposed between each of these oppositely extending plates and the hull of the tank. Preferably, one of these plates is disposed on one side of the hull while the opposite plate is disposed along the opposite surface of the hull wall so that the mounting has, in plan view, a Z configuration in which the legs are formed by the plates and the body of the Z is formed by the final-drive housing.

The elastomeric bodies between the plates and the opposite faces of the hull wall are thus capable of damping the oscillations generated by the polygon effect of the chain or track on the track-driving wheel without concern for the direction in which these oscillations tend to displace the final-drive housing. The elastomeric slabs are capable of yielding resiliently in all directions of movement of the axis of the final drive parallel to itself. The cushion can be vulcanized to the plates and to the hull of the tank can be, affixed thereto by adhesives or can be otherwise bonded to the juxtaposed and parallel surfaces of the hull wall and the plate which is spaced therefrom by the elastomeric cushion.

The static strength of the mounting can be augmented when, in accordance with another feature of the invention, another pair of such plates are provided, in an inverse Z arrangement so that each plate has a counterpart on the opposite side of the hull and is welded to the final-drive housing while being spaced from the respective surface of the hull via an elastomeric slab or body. The mounting thus consists of two U-shaped structures extending in opposite directions but generally parallel to the tractive force and having legs straddling the hull. The legs of each U sandwich between them a pair of elastomeric slabs such that when one slab is stressed under compression, the elastomeric slab lying opposite it is under tension and vice versa for an especially effective oscillation damping action. The oscillation damping is primarily converted into shear forces in the elastomeric bodies. Best results are obtained when the resilient members are composed of rubber since rubber can be highly loaded in compression and provides a relatively large excursion with any desired degree of stiffness. A more limited mobility in the shear direction is also an advantage.

In spite of the fact that the track tension results in tension and pressure stresses, the oscillations generated thereby are transformed into shear stresses in the elastomeric cushion so that a tilting of the final drive is avoided and a high degree of damping is ensured.

According to another feature of the invention, the final drive is resiliently mounted relative to the tank hull by an angular elastomeric body which surrounds the final drive and supports the latter against the hull. This arrangement has been found to be especially effective when the forces applied to the final drive are nonuniform.

The elastic ring can be disposed between an inner support ring rigid with the housing of the final drive and an outer support ring rigid with the tank hull, the support rings defining between them an annular gap spanned by the elastomeric ring and having parallel walls. Advantageously, these walls can include an angle with the axis of the final drive which is constant over the entire circumference of the latter or varies around the circumference between 0° and 90°. By selection of this angle, included between the parallel walls of the gap and the axis of the final drive, the yielding characteristics and stress characteristics of the elastomeric ring can be established to place the ring predominantly in compression, predominantly in shear or in any combination of the two according to the vibrations and shock forces which are applied to the final drive.

This inclined orientation is not limited, however, to annular elastomeric bodies but can be provided between support plates, in which case the elastomeric body can be constituted in the form of flat cushions. When the angle of inclination of the surface is 0°, the periphery of the final drive can constitute the inner support ring.

It has also been found to be advantageous, in adjusting elastomeric ring characteristics to accommodate the shock stresses to vary the axial width of the support rings, about the axis of the final drive, and to narrow or widen the elastomeric cushion accordingly. Thus the elastomeric ring can be wider at one location than at another location around the axis of the final drive. Finally, with respect to compensating for directional characteristics of the shock forces which are applied to the final drive, the elastomeric ring can have different radial thicknesses at different locations about the axis of the drive.

One of the advantages of each of the embodiments described previously is that the elastic support of the final drive unit is limited to the region in which this unit traverses the opening in the hull of the vehicle. This means that the mounting is provided only at one end of the final drive. It requires a minimum space which is of great significance in tracked vehicles of the war machine type and especially tanks, half-tracks, track reconnaissance vehicles and tracked amphibious vehicles. Of course, if sufficient room is available, two such elastic mounts can be provided.

The embodiments of the invention which make use of an elastic ring have the advantage that the ring simultaneously forms a seal in the gap between the hull wall and the final drive. An additional sealing member is thus not necessary.

BRIEF DESCRIPTION OF THE DRAWING

The above and other objects, features and advantages of the present invention will become more readily apparent from the following description, reference being made to the accompanying drawing in which:

FIG. 1A is a section taken along line IA—IA of FIG. 1;

FIG. 2A is a view taken generally along the line IIA—IIA of FIG. 2 but representing a modification;

FIG. 2B is a section taken along line IIB—IIB of FIG. 2A; and

SPECIFIC DESCRIPTION

Figure 1:
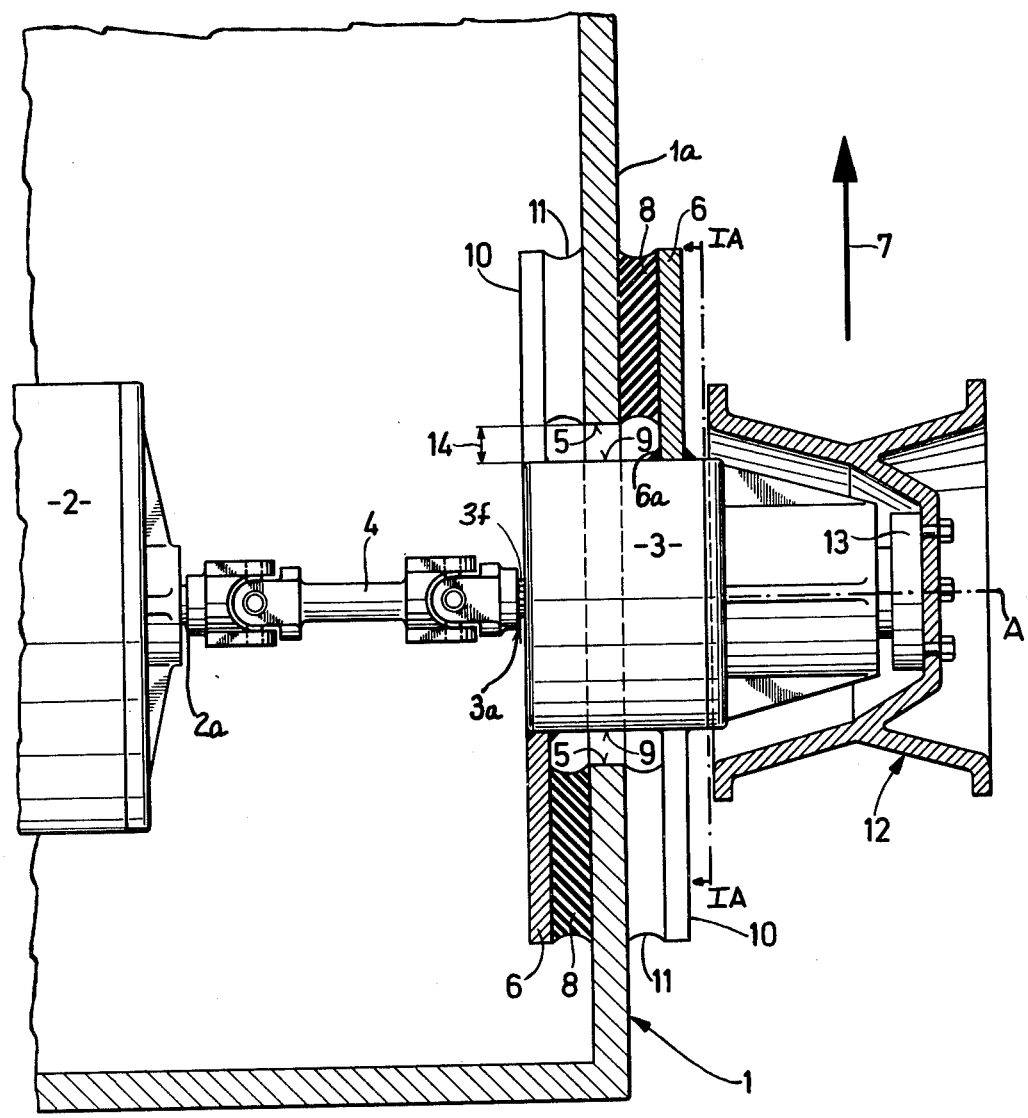
FIG. 1 is an axial section diagrammatically illustrating in plan view a mounting system of the invention.

FIG. 1 shows a portion of a tracked vehicle whose body or hull 1 is provided with an opening 5 receiving with all-around clearance the housing shell 9 of a final drive 3 which can be a planetary gear transmission.

The input shaft 3a of the planetary gear transmission 3 is splined at 3F and is connected by a cardan shaft 4 to the output shaft 2a of the main power train of the vehicle which has been represented at 2. The cardan shaft 4 constitutes a double-universal joint arrangement capable of movement via the spline shaft 3a relevant to the drive 4 so that the axis A of the latter can be shifted in all directions relevant to the vehicle body 1 as long as it remains parallel to itself and perpendicular to the wall 1a of the hull.

The shell 9 of this transmission 3 carries a pair of plates 6 which are disposed on opposite sides of the wall 1a and diametrically opposite one another with respect to the shell 9 but welded at 6a to the wheel. The plates 6 thus form a Z mounting with the housing of the transmission 3. The plates 6 extend in the direction of track tension which has been represented by arrow 7. The plates 6 are each supported against the wall 1a of the housing by an elastomeric body 8 formed as a slab of rubber which is vulcanized both to the wall 1a and to the respective plates 6. The plates 6 constitute outriggers mounted on the housing shell 9 of the final transmission 3. When a force is applied in the direction of arrow 7 to the wheel 12 mounted upon the output shaft 13 of the planetary gear transmission, the cushion 8 shown uppermost in FIG. 1 is placed under compression as is the lower cushion 8.

We have shown further support plates 10 which can be welded to diametrically opposite sides of the housing 9. On opposite sides of the housing 9, therefore, the wall 1a of the hull 1 is straddled by a U formed by one plate 6, the opposite plate 10 and the portion of the shell 9 interconnecting same. When the elastomeric bodies 8 are placed under compression the elastomerics 11 are under tension.

It will be immediately apparent from FIG. 1 that, when the substantially linear link of the track or chain passes around the sprocket or drive wheel 12, the polygonal effect generates periodic oscillations which are transformed into shear forces within the elastic bodies 8 and 11 and thus are strongly damped. Minimum disturbance of the personnel in the vehicle and the instruments therein thus results.

As can be seen from FIG. 1A, the transmission 3 can comprise a ring gear 3e disposed within the shell 9 and fixed thereto, a plurality of planetary gears 3d meshing with the ring gear 3e and having a spider (not shown) which is connected to the hub 13, and a sun gear 3b which is keyed at 3c, to the shaft 3a mentioned previously. While the plates 6 may be substantially rectangular, they may, if space permits, be sectoral as illustrated in FIG. 1A and can widen outwardly from the housing 9. The elastomeric cushion represented beneath plate 6 shown in FIG. 1A can be subdivided into portions 8a, 8b and 8c of different stiffness or spring hardness (i.e. greater or lesser restoring force) and a similar variation in restoring force can be provided radially outwardly from the housing 9.

To prevent overloading of the elastomeric slabs 8 and 11 in shear, the spring movement is limited by rigid abutments which can be formed by the wall of housing shell 9 and the juxtaposed wall of the opening 5. The spring movement in any direction, prior to engagement of the abutment, is thus represented by the double-headed arrow 14 in FIG. 1.

Figure 2:
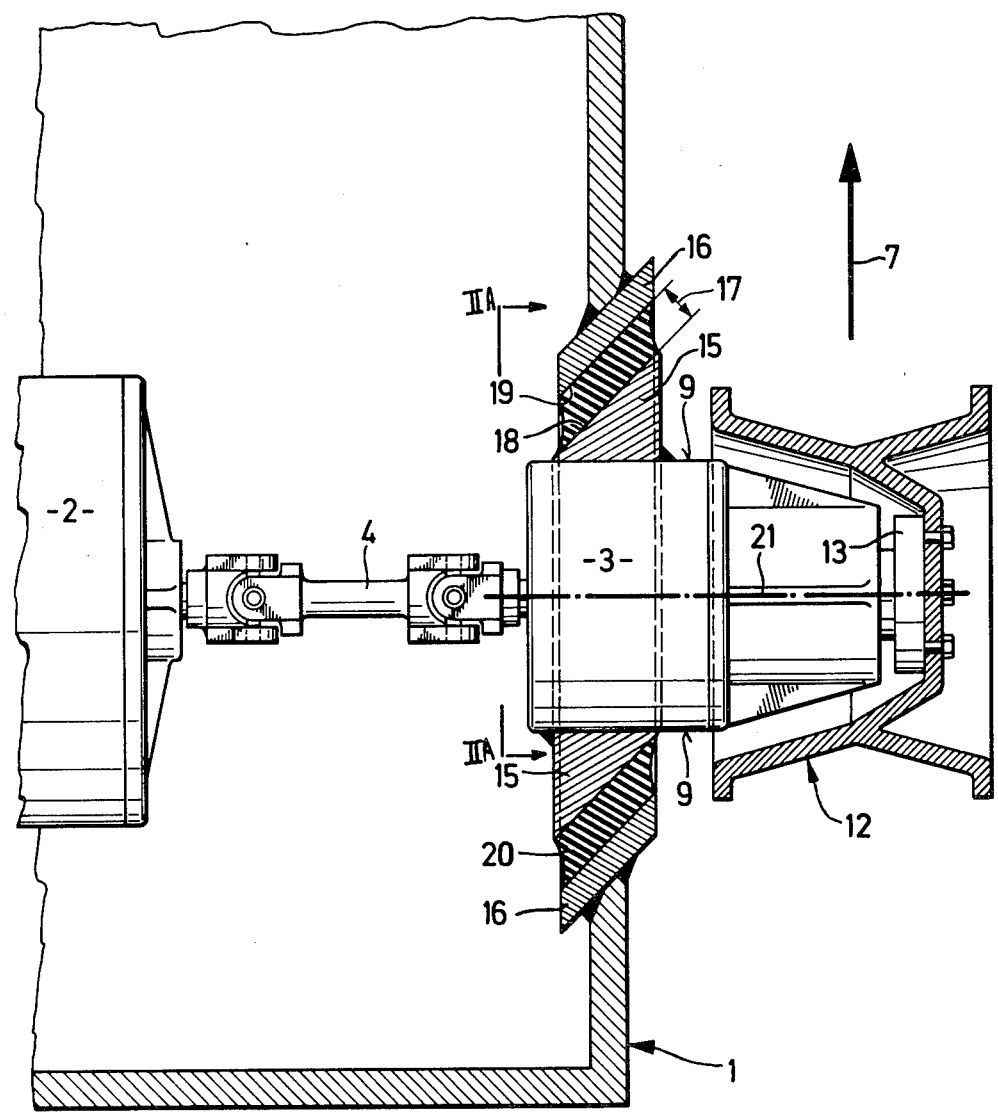
FIG. 2 is a view similar to FIG. 1 of another embodiment.

FIG. 2 shows a modification of the system of FIG. 1 in which the housing shell 9 of the final drive 3 is provided with an inner support ring 15, e.g. by welding, the ring 15 being disposed within the opening in the wall of the tank hull 1. The opening itself is lined with a second support ring 16, which is welded to the tank hull 1, defining an annular gap of a width 17 with the inner support ring 15. The gap is formed between parallel walls 18 and 19 which are inclined at an acute angle to the axis 21 of the final drive. The gap is filled by an elastomeric body 20 which can be vulcanized to the parallel walls 18 and 19.

In the embodiment of FIG. 2, the angle included between the parallel walls 18, 19 and the axis 21 is about 45°. This inclined orientation of the force transmitting surfaces at their junctions with the elastomeric body or ring 20 transforms the radial compression forces which would otherwise apply to the elastomeric bodies at least in part into shear forces so that the body is subjected to shear and compression as has been described for the elastomeric cushions 8 of the embodiment of FIG. 1.

FIG. 2a is a view taken generally along the line IIA—IIA of FIG. 2 but illustrating an embodiment which is modified such that the angle of inclination of the surfaces of the rings 15', 16', sandwiching the elastomeric ring 20' between them varies from a maximum to a minimum in the region 15". In this region, as can be seen in FIG. 2B, the ring 16' has its surface 19' parallel to the axis (corresponding to an angle of 0° with the axis) while the inner ring 15' is omitted and the inner support formed directly by the surface 9' of the drive 3.

Figure 3:
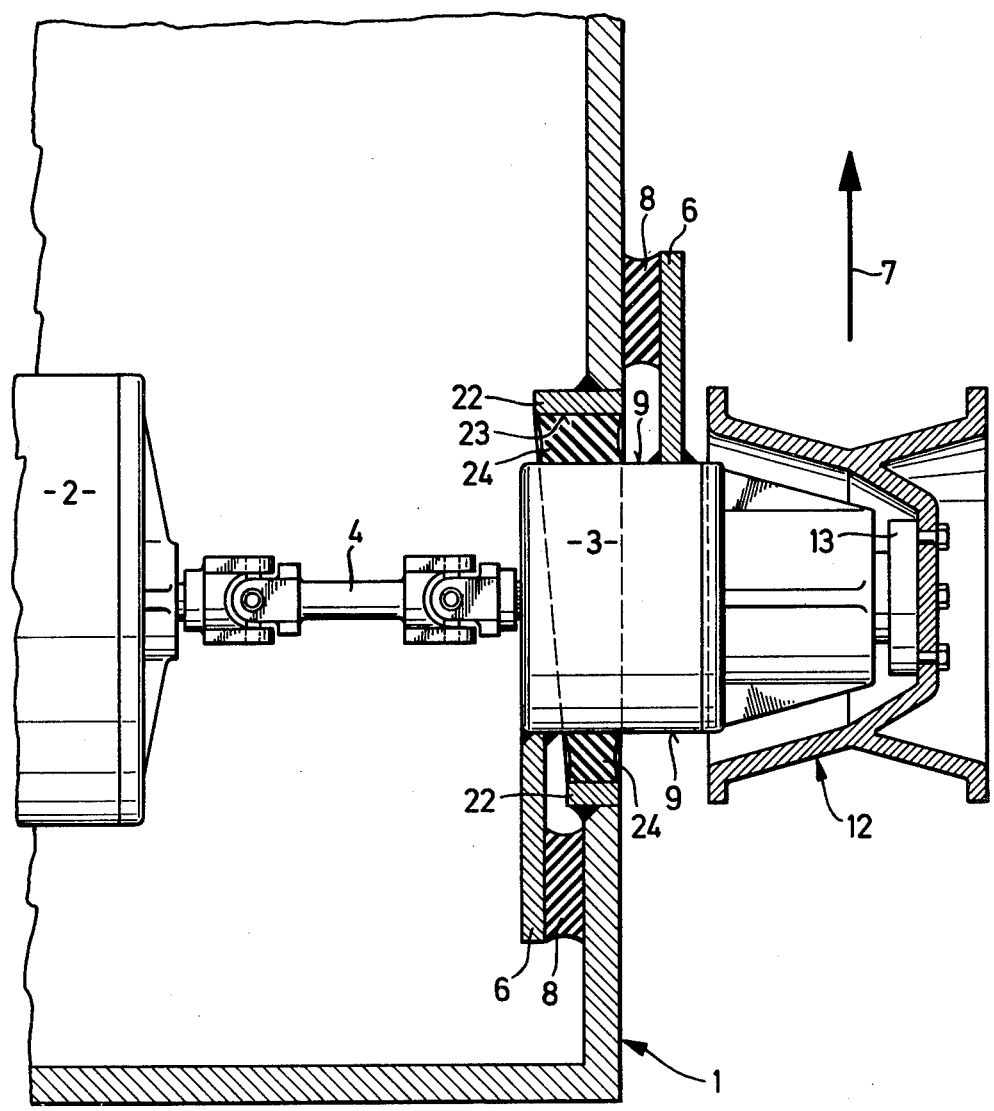
FIG. 3 is another view similar to FIG. 1 and illustrating still another third embodiment of the invention.

FIG. 3 illustrates still another embodiment of the invention wherein support plates 6 are provided as described in FIG. 1, the support plates being welded to the final drive housing 9 and extending in opposite directions parallel to the direction 7 of the track tension. However, in this embodiment, as in the embodiment of FIG. 2, the gap in the hull wall surrounding the final drive 3 is filled by an elastomeric ring 24 which serves both as a resilient member and as a seal. The mounting includes an outer support ring 22 welded around the edge of the hull opening and an inner support ring formed by the housing 9 of the final drive 3, the elastomeric ring 24 filling the space between these support rings or surfaces. As can be seen from FIG. 3, the width of the ring 22 (measured along the axis of the drive) is greater in the direction of track tension (arrow 7) than in the opposite direction. This means that in the direction of maximum force application, a larger pressurizable surface is provided so that the elastic cushions 8 are not as strongly subjected to shear as is the case with the embodiment of FIG. 1.

We claim:

1. A mounting device for the final drive of a tracklaying vehicle having a wall provided with an opening, said final drive extending with clearance through said opening, said mounting device comprising:
    means enabling movement of said final drive in said opening in substantially all directions perpendicular to the axis of said final drive with said axis maintained substantially parallel to itself; and
    elastic means braced between said wall and said final drive for resiliently resisting said movement, said elastic means extending around the axis of said final drive and having a stiffness which varies in a direction radial to said axis and in a direction parallel to said axis around the periphery of said final drive.

2. The mounting device defined in claim 1 wherein the stiffness of said elastic means in a direction parallel to the axis of said final drive is greater than the stiffness in a plane perpendicular to said axis.

3. The mounting device defined in claim 1 wherein said elastic means includes a body of elastomeric material.

4. A mounting device for the final drive of a tracklaying vehicle having a wall provided with an opening, said final drive extending with clearance through said opening, said mounting device comprising:
    means enabling movement of said final drive in said opening in substantially all directions perpendicular to the axis of said final drive with said axis maintained substantially parallel to itself; and
    elastic means braced between said wall and said final drive for resiliently resisting said movement, said final drive having a housing and said elastic means including a first plate fixed to said housing and extending substantially parallel to said wall on one side thereof in the direction of track tension, a second plate disposed on the opposite side of said wall and fixed to said housing while extending in the opposite direction, and respective elastomeric cushions sandwiched between each of said plates and said wall.

5. The mounting device defined in claim 4, further comprising another plate extending codirectionally with each of said first and second plates on the opposite side of the wall therefrom and sandwiching respective elastomeric bodies against said wall, said further plates being secured to said housing.

6. The mounting device defined in claim 4 wherein said final drive is provided with a housing and said elastic means includes an elastomeric ring surrounding said housing.

7. The mounting device defined in claim 4, further comprising rigid abutment means between said wall and said final drive for direct engagement upon maximum yielding of said elastic means.

8. A mounting device for the final drive of a tracklaying vehicle having a wall provided with an opening, said final drive extending with clearance through said opening, said mounting device comprising:
    means enabling movement of said final drive in said opening in substantially all directions perpendicular to the axis of said final drive with said axis maintained substantially parallel to itself; and
    elastic means braced between said wall and said final drive for resiliently resisting said movement, said final drive being provided with a housing and said elastic means including an elastomeric ring surrounding said housing, a first support ring fixed to said wall, a second support ring fixed to said final drive, said support rings having parallel walls defining an annular gap between them, said elastomeric ring filling said gap, said parallel walls including an angle with said axis between 0° and 90°, the width of said elastomeric ring measured parallel to said axis varying around the periphery of said final drive.

9. A mounting device for the final drive of a tracklaying vehicle having a wall provided with an opening, said final drive extending with clearance through said opening, said mounting device comprising:
    means enabling movement of said final drive in said opening in substantially all directions perpendicular to the axis of said final drive with said axis maintained substantially parallel to itself; and
    elastic means braced between said wall and said final drive for resiliently resisting said movement, said final drive being provided with a housing and said elastic means being an elastomeric ring surrounding said housing, the thickness of said elastic ring varying around the periphery of said final drive.

10. A mounting device for the final drive of a tracklaying vehicle having a vehicle chassis formed with a wall provided with an opening, said final drive including a housing received with clearance in and extending through said opening, said mounting device comprising:
    means enabling movement of said final drive in said opening in substantially all directions perpendicular to the axis of said final drive with said axis maintained substantially parallel to itself; and
    elastic means including a body of elastomeric material braced between said wall and said housing for resiliently resisting said movement, said body including an elastomeric ring surrounding said housing in said opening.

11. The mounting device defined in claim 10 wherein said elastic means also includes a first support ring fixed to said wall and a second support ring fixed to said housing, said support rings having parallel walls coaxial with said housing and defining an annular gap between them, said elastomeric ring filling said gap.

* * * * *